(12) United States Patent
Becker et al.

(10) Patent No.: US 7,938,034 B2
(45) Date of Patent: May 10, 2011

(54) ACTUATOR FOR A MOTOR VEHICLE WITH A TRANSMISSION

(75) Inventors: Burckhard Becker, Solingen (DE); Wilfried Beneker, Leichlingen (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 388 days.

(21) Appl. No.: 12/141,573

(22) Filed: Jun. 18, 2008

(65) Prior Publication Data
US 2008/0314174 A1    Dec. 25, 2008

(30) Foreign Application Priority Data

Jun. 19, 2007 (DE) .......................... 10 2007 028 623
Apr. 3, 2008 (DE) .......................... 10 2008 017 006

(51) Int. Cl.
*F16H 29/20* (2006.01)
(52) U.S. Cl. ....................................... 74/89.23
(58) Field of Classification Search ............. 74/89, 89.2, 74/89.23, 89.27, 89.28; 296/65.15
See application file for complete search history.

(56) References Cited

U.S. PATENT DOCUMENTS

| | | | | |
|---|---|---|---|---|
| 2,929,439 A | * | 3/1960 | Tanaka et al. | 248/393 |
| 3,066,907 A | * | 12/1962 | Latimer et al. | 248/420 |
| 5,456,439 A | * | 10/1995 | Gauger | 248/429 |
| 5,735,500 A | * | 4/1998 | Borlinghaus et al. | 248/419 |
| 5,860,319 A | | 1/1999 | Via | |
| 5,924,668 A | | 7/1999 | Garrido | |
| 6,260,922 B1 | * | 7/2001 | Frohnhaus et al. | 297/330 |

FOREIGN PATENT DOCUMENTS

WO    WO 03/068551 A1    8/2003

\* cited by examiner

*Primary Examiner* — Vicky A Johnson
(74) *Attorney, Agent, or Firm* — McCarter & English, LLP

(57) ABSTRACT

The actuator for a motor vehicle has an electric motor driving an output shaft and a transmission comprising a worm, a spindle nut and a spindle. The worm is rotatably connected to the output shaft. The spindle nut comprises a worm gear that engages the worm and also a spindle thread that engages the spindle. The worm has a worm axis and the spindle nut has a spindle nut axis. The worm axis and the spindle nut axis draw an angle alpha of between about 85 ° and about 5° and, in one embodiment, between about 70° and about 40° .

16 Claims, 2 Drawing Sheets

Stand der Technik
state of the art

ACTUATOR FOR A MOTOR VEHICLE WITH A TRANSMISSION

CROSS-REFERENCE TO RELATED APPLICATIONS

This application claims priority to German Application Nos. DE 10 2007 028 623.8, filed Jun. 19, 2007 and DE 10 2008 017 006.2, filed Apr. 3, 2008, both of which are hereby incorporated by reference in their entireties as part of the present disclosure.

BACKGROUND OF THE INVENTION

The invention relates to an actuator for a motor vehicle, more specifically for a motor vehicle seat, with an electric motor having an output shaft, with a transmission comprising a worm, a spindle nut and a spindle, said worm being rotationally joined to said output shaft, said spindle nut comprising a worm gear that engages said worm and also a spindle thread that engages said spindle, said worm having a worm axis and said spindle nut having a spindle nut axis as well as to a longitudinal adjustment device equipped with such an actuator. Such type actuators have been known from WO 03/068551 A1, U.S. Pat. Nos. 5,924,668 A, 5,860,319 A and 6,260,922 B1.

The worm axes thereby extend at an angle of 90° or at an angle of 0° to the longitudinal direction of the spindle, the longitudinal direction of the spindle coinciding with the axis of the spindle nut. Usually, the electric motor is connected through a bendable shaft to the transmission, meaning to the worm. It has been found out that, in operation, this bendable shaft may generate noises which in most cases do not occur permanently but under certain strains, possibly already in the event of an adjustment in one direction. Such type noises are disadvantageous. Many attempts have been made to minimize or dampen these noises.

Many actuators, for example the one according to U.S. Pat. No. 6,260,922 B1, have the electric motor located on a line joining the worms of the two pairs of rails. The bendable shaft extends more or less on a straight line. The electric motor is thereby located on the motor vehicle seat at a place offering little space, namely substantially directly underneath a passenger's buttocks. If it is wanted to accommodate the passenger as deep as possible inside the motor vehicle, there is too little space left for an electric motor beneath his buttocks; in the x direction toward the front, for example beneath the thighs, there is space available, though.

This is where the invention comes into play. It is an object of the invention to dispose the electric motor farther front with respect to the deepest point of the seat in the x direction so that the general structure height may be reduced, meaning so that the passenger may be disposed in closer proximity to an undercarriage of the motor vehicle than hitherto possible.

SUMMARY OF THE INVENTION

In one aspect, the object is solved by an actuator for a motor vehicle seat comprising an electric motor having an output shaft, a transmission comprising a worm, a spindle nut and a spindle. The worm is rotationally joined to the output shaft, and the spindle nut comprises a worm gear that engages the worm and a spindle thread that engages the spindle. The worm defines a worm axis and the spindle nut defines a spindle nut axis. In one embodiment, the worm axis and the spindle nut axis are inclined at an angle in the range between about 85° and about 5°, to each other.

In another aspect, the object is further solved by the actuator set forth above, wherein the longitudinal adjustment device comprises two pairs of rails and the electric motor is disposed between these two pairs of rails, said electric motor being located in front of the at least one spindle nut in the x direction. In one embodiment, the longitudinal adjustment device comprises two pairs of rails and the electric motor is disposed between these two pairs of rails, said electric motor being located at least 10 mm in front of the at least one spindle nut. In another embodiment, the electric motor is located at least 30 mm in front of the at least one spindle nut.

In another aspect, the invention proposes to dispose the worm no longer at an angle of 90° or 0° with respect to the spindle nut, but in an angular range lying between these hitherto known values. This provision makes it possible to dispose the line joining the electric motor and the transmission no longer parallel to the y direction but at an angle of more than 5° with respect to this direction. Thus, the electric motor can be disposed somewhere else in the x direction as compared to the transmission. As a result, the transmission can be positioned in the region of the deepest point of the seat, whilst the electric motor can be positioned in front thereof or at need also behind, namely at a place where less space is needed for the passenger. The electric motor may thus be disposed for example beneath the thighs of the passenger, meaning it can be placed nearer to the front edge of the seat than previously possible in the art.

Preferably, the worm is connected to the output shaft of the electric motor through a bendable shaft and said bendable shaft is curved, the direction of the curve between worm and output shaft being maintained, namely either a right-handed curve or a left-handed curve, in no case does it have an inflexion point. On this actuator, the connecting shaft between the output shaft and the worm is no longer rectilinear but curved, although it is only curved in one direction. It has been found out that bendable shafts that are only curved in one direction produce considerably less noise than bendable shafts extending in a straight line on the one side and bendable shafts having an inflexion point in their curvature on the other side.

Preferably, the worm axes of the two transmissions of the two pairs of rails define a plane and the output shaft of the electric motor is either located in this plane or is offset upward or downward in the z direction by 30 mm maximum, preferably by 10 mm maximum. Thus, a place can be indicated that offers sufficient space for the electric motor.

In a preferred embodiment, the actuator is part of a longitudinal adjustment device comprising two pairs of rails. The electric motor is thereby interposed between these two pairs of rails and is located in front of the at least one spindle nut in the x direction, more specifically at least 10 mm, preferably 30 mm, in front of the at least one spindle nut. The actuator of the invention is preferably suited for longitudinal adjustment devices, but may also be utilized for other adjustment devices in a motor vehicle, more specifically in a motor vehicle seat.

Preferably, the electric motor is located in the center between the two pairs of rails or is offset from the center toward a pair of rail by at least 10 mm. This makes it possible to advantageously position the electric motor.

BRIEF DESCRIPTION OF THE DRAWINGS

Other features and advantages will become more apparent upon reviewing the appended claims and the following non restrictive description of one embodiment of the invention, given by way of example only with reference to the drawing. In said drawing:

In said drawing.

DETAILED DESCRIPTION OF THE INVENTION

Figure 1:
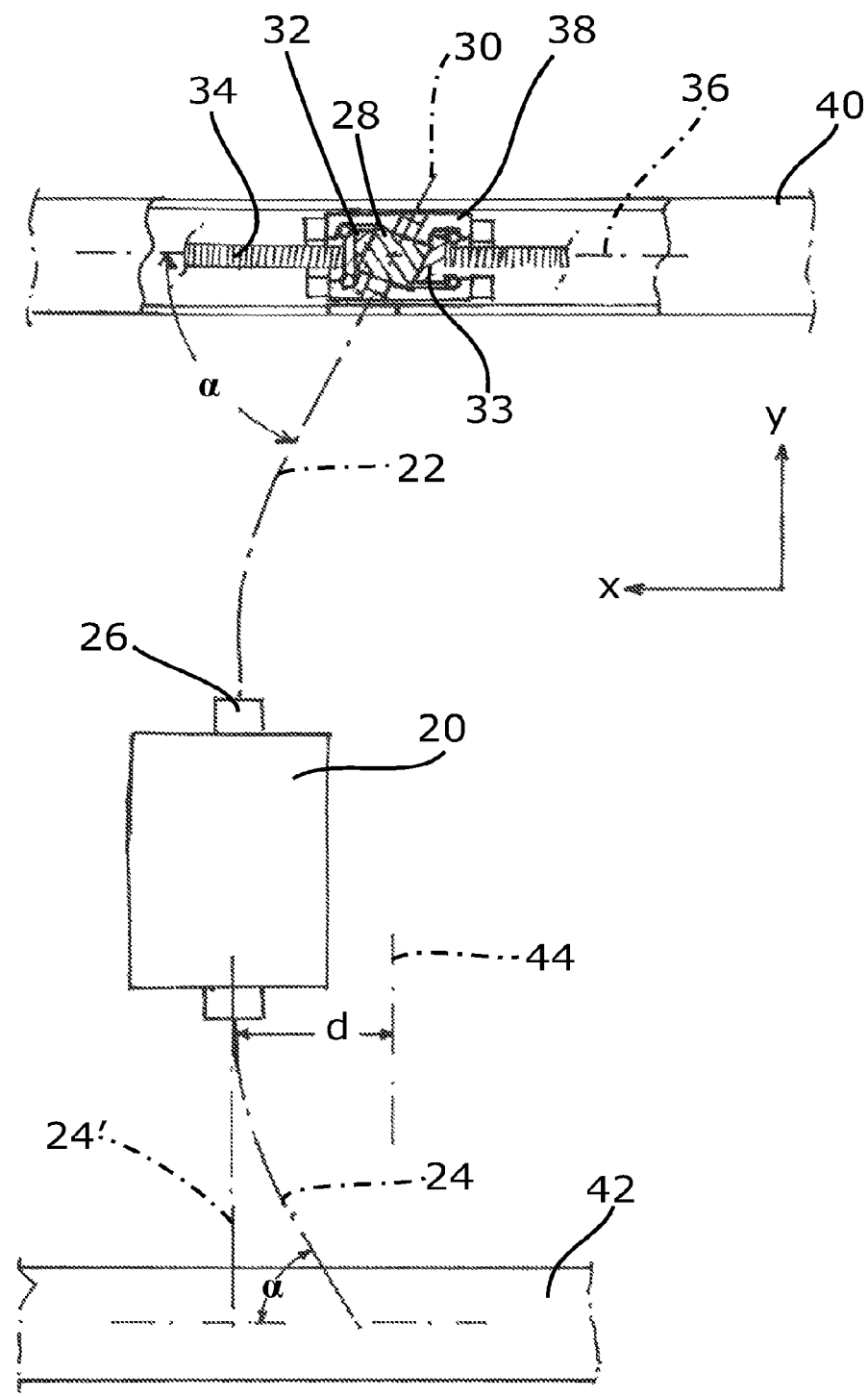
FIG. 1: shows a simplified top view in the negative z direction of the most important parts of a longitudinal adjustment device for a motor vehicle seat having two pairs of rails, one upper pair of rails being shown in a sectional view so that a transmission can be seen.

An electric motor 20, which is connected at a respective one of its ends to a flexible shaft 22 and 24 respectively, can be seen from FIG. 1. These flexible shafts are connected to an output shaft 26 of the electric motor 20. Each flexible shaft 22 and 24 is in turn connected to a worm 28 having a worm gear axis 30. This worm 28 is part of a transmission which also possesses a spindle nut 32 and a spindle 34. The spindle nut 32 has a spindle nut axis 36 that coincides with the axis of the spindle 34. The spindle nut 32 comprises a worm gear 33 that engages the worm 28. The transmission is disposed in a gear case 38. For details regarding the transmission, and also the gear case for example, the reader is referred to the prior art as cited.

The worm axis 30 and the spindle nut axis 36 are disposed at an angle alpha to each other of about 65° for the upper part of FIG. 1 and of about 60° for the lower part of FIG. 1. In the lower part, there is also shown an alternative configuration of the flexible shaft 24, namely in the implementation 24', which extends in a straight line like in prior art, with the angle alpha being 90° in this case.

The flexible shaft 22, which extends between the output shaft 26 and the upper worm 28, extends in a curved line, in only one curve direction, namely in a right-handed curve, when viewed from the electric motor 20. It has no inflexion point. The first derivative is always greater than zero or smaller than zero, it never becomes zero. The flexible shaft 22 lies in the plane of the drawing. The lower shaft 24, which is more flexible (in the implementation 24), also has a curvature, which also only has one direction that is, when viewed again from the electric motor 20 downward, a left-handed curve. Again, there is no inflexion point. This flexible shaft 24 also lies in the plane of the drawing sheet.

The electric motor 20, more precisely the output shaft 26 and, as a result thereof, the axis of rotation of the electric motor 20, is inclined at an angle of 90° to the longitudinal axis of the two pairs of rails 40, 42. It is possible to dispose the electric motor 20 at an angle different from 90°, for example at an angle of 80°. The angular range of the deviation from the right angle should however be smaller than the angle alpha or α, the deviation from the right angle should for example be 20° maximum, more specifically 15° maximum.

In the illustration shown in FIG. 1, the electric motor 20 is not spaced the same distance from the two pairs of rails 40, 42; it is somewhat nearer to the second pair of rails 42. Other configurations are possible, more specifically configurations in which the electric motor 20 is located in the center.

d shows the distance the output shaft 26 of the electric motor 20 is offset from a line 44 that extends in the plane of the drawing, is perpendicular to the axis 36 of the spindle nut and passes through the center of the upper worm 28. According to prior art, the output shaft 26 were to lie on the line 44. The electric motor 20 can be offset by d toward the front in the x direction (substantially in this direction).

In addition thereto, the electric motor 20 may also be offset in the z direction with respect to the illustration shown in FIG. 1, meaning it can be disposed above the plane of the drawing or beneath the plane of the drawing. In this way, it is possible to find for the electric motor 20 a favourable position in terms of space.

Figure 2:
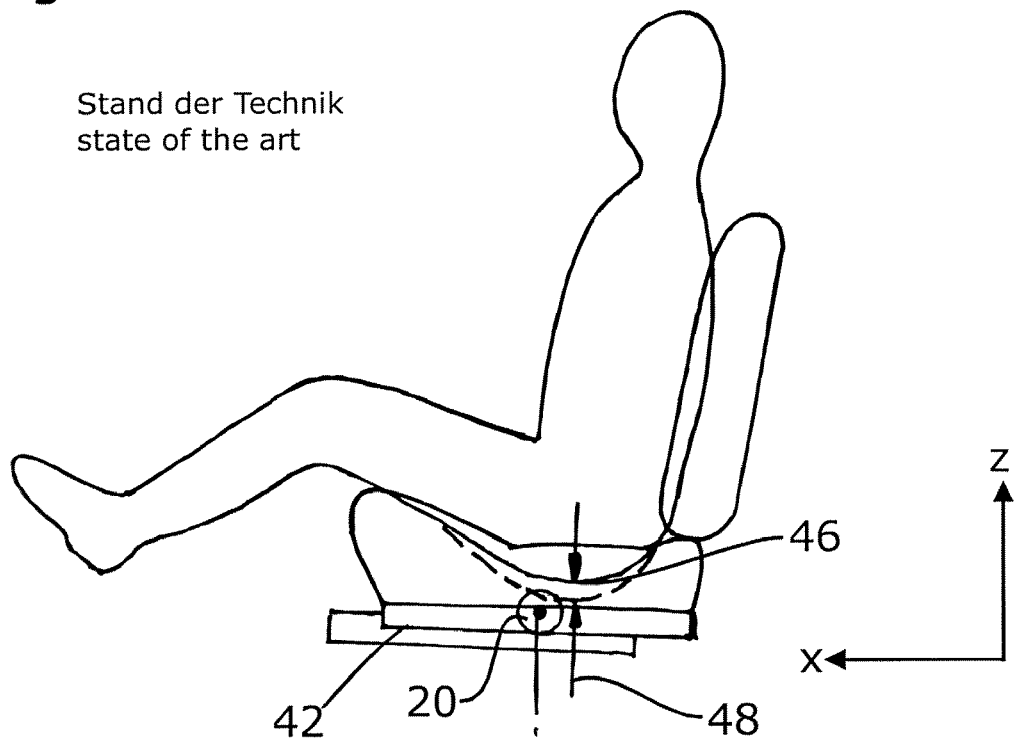
FIG. 2: shows a side view of a prior art motor vehicle seat with a person seated on it.

FIG. 2 shows how the electric motor 20 is disposed in immediate proximity to the deepest point 46 of the seat in prior art. In addition thereto, the spring deflection is shown in a dashed line; it appears that the electric motor 20 already collides with the dashed deflection line so that no padding remains. The deflection path is indicated by two opposing arrows 48.

Figure 3:
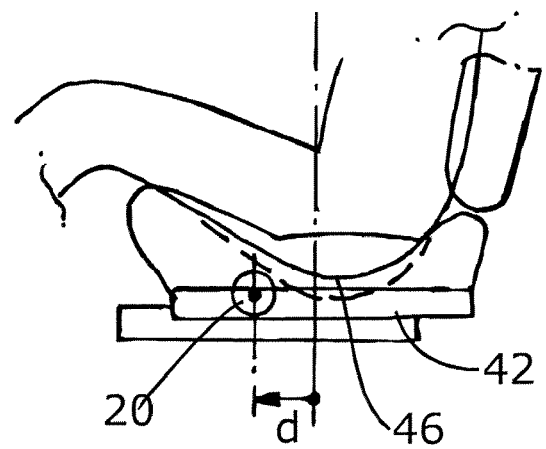
FIG. 3: shows the illustration like in FIG. 2, but now in accordance with the invention.

By contrast, in the configuration of the invention as shown in FIG. 3, the electric motor 20 is offset toward the front in the x direction by the distance d. It appears that it no longer collides with the dashed line of maximum deflection and that it is spaced sufficiently apart from the deepest point 46 of the seat in front thereof. Except for the different position of the electric motor 20, the FIGS. 2 and 3 do not differ factually.

What is claimed is:

1. An longitudinal adjustment device for a motor vehicle seat comprising:
    an electric motor having an output shaft;
    a transmission comprising a worm, a spindle nut and a spindle, said worm being rotationally joined to said output shaft, said spindle nut comprising a worm gear that engages said worm and a spindle thread that engages said spindle, said worm having a worm axis and said spindle nut having a spindle nut axis,
    wherein said worm axis and said spindle nut axis are inclined at an angle in the range between 85° and 5°, to each other.

2. The longitudinal adjustment device as set forth in claim 1, wherein the worm is connected to the output shaft of the electric motor through a flexible shaft.

3. The longitudinal adjustment device as set forth in claim 2, wherein the flexible shaft is curved and the direction of the curve is maintained between the worm and the output shaft, constituting either a right-handed or a left-handed curve, and that it has no inflexion point in any case.

4. The longitudinal adjustment device as set forth in claim 1, wherein the output shaft of the electric motor extends at an angle of about 90° with respect to the spindle nut axis.

5. The longitudinal adjustment device as set forth in claim 1, wherein the output shaft of the electric motor extends at an angle ranging between about 75° and about 105° with respect to the spindle nut axis.

6. The longitudinal adjustment device as set forth in claim 1, further comprising two pairs of rails and the electric motor is disposed between these two pairs of rails, said electric motor being located in front of the spindle nut in the x direction.

7. The longitudinal adjustment device as set forth in claim 6, wherein a transmission is associated with each pair of rails, the motor is located between two flexible shafts and the angle drawn by the worm axis and by the spindle nut axis of one of the transmissions differs by at least about 5° from the value of the angle drawn by the spindle nut axis and the worm axis of the other transmission.

8. The longitudinal adjustment device as set forth in claim 7, wherein the worm axes of the two transmissions of the two pairs of rails define a plane and the output shaft of the electric motor is offset upward or downward by 30 mm maximum in the z direction.

9. The longitudinal adjustment device as set forth in claim 6, wherein the electric motor is located in the center between the two pairs of rails or is offset by at least 10 mm from the center toward one pair of rails.

10. The longitudinal adjustment device as set forth in claim 6, wherein the output shaft of the electric motor extends at an angle ranging between about 75° and about 105° with respect to the spindle nut axis.

11. The longitudinal adjustment device as set forth in claim 6, wherein said electric motor is located in the x direction at least 10 mm in front of the spindle nut.

12. The longitudinal adjustment device as set forth in claim 11, wherein said electric motor is located in the x direction at least 30 mm in front of the spindle nut.

13. The longitudinal adjustment device as set forth in claim 6, wherein a transmission is associated with each pair of rails, the motor is located between two flexible shafts and the angle drawn by the worm axis and by the spindle nut axis of one of the transmissions is equal to the value of the angle drawn by the spindle nut axis and the worm axis of the other transmission.

14. The longitudinal adjustment device as set forth in claim 1, further comprising two pairs of rails and the electric motor is disposed between these two pairs of rails, said electric motor being located at least 10 mm in front of the spindle nut.

15. The longitudinal adjustment device as set forth in claim 14, wherein said electric motor is located at least 30 mm in front of the spindle nut.

16. The longitudinal adjustment device as set forth in claim 1, wherein said worm axis and said spindle nut axis are inclined at an angle in the range between about 70° and about 40°, to each other.

* * * * *